April 4, 1961 J. A. MUNRO 2,978,071
BABY CARRIAGE BRAKE
Filed Aug. 12, 1958
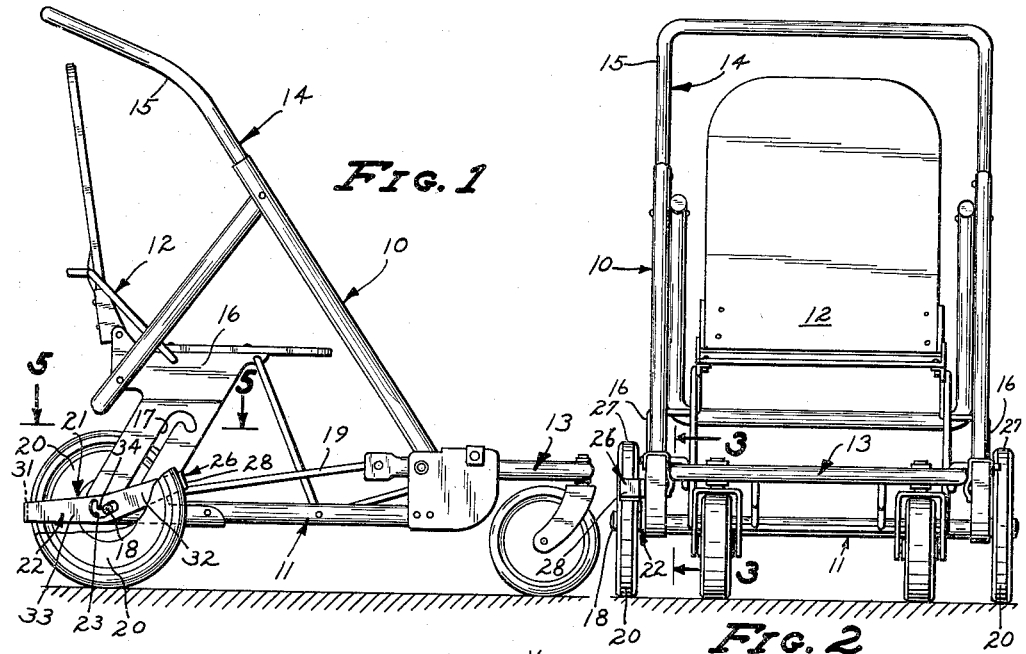
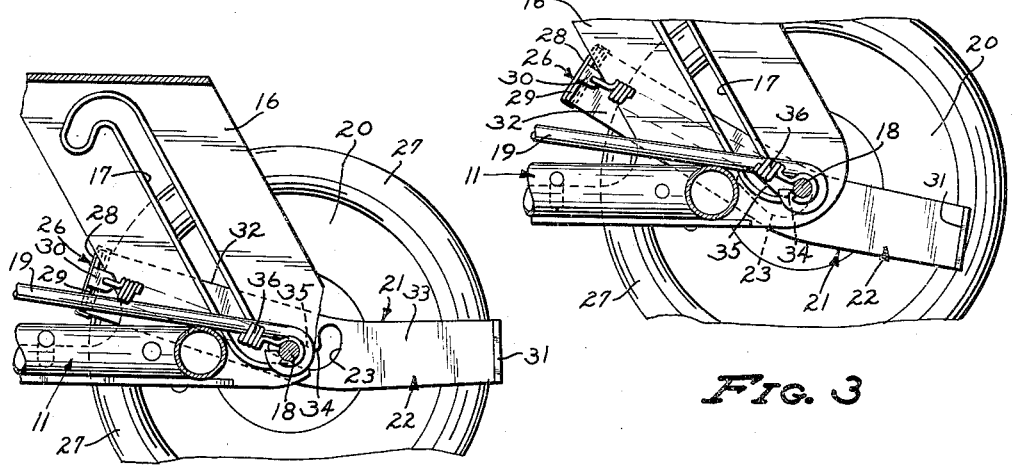
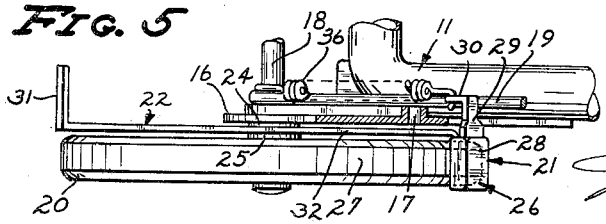
INVENTOR.
JERROLD A. MUNRO
BY
ATTORNEYS

United States Patent Office 2,978,071
Patented Apr. 4, 1961

2,978,071

BABY CARRIAGE BRAKE

Jerrold A. Munro, Rolla, N. Dak.

Filed Aug. 12, 1958, Ser. No. 754,582

3 Claims. (Cl. 188—20)

My invention relates to a novel and improved braking mechanism for baby carriages. Although my invention is hereinafter specifically disclosed and described in a baby carriage of the type generally known as a stroller, my invention is not limited to such type of carriage and is adapted for use with a variety of baby carriages.

An object of my invention is to provide a novel and improved baby carriage brake or braking mechanism.

A further object of my invention is to provide a braking mechanism for baby carriages which is easily and inexpensively manufactured, which is reliably effective in operation, and which is easily and simply operated.

A further object of my invention is to provide a novel and improved braking mechanism which may be used with a wide variety of baby carriages now known without modification of the structures thereof.

A still further object of my invention is to provide a novel and improved braking mechanism for baby carriages which is unobstrusive in structure and position on the baby carriage so that it does not detract from the appearance thereof in any way, and yet which is positioned so as to be easily accessible and readily and safely operated.

The above and other objects and advantages of my invention will become apparent from the following specification, appended claims and attached drawings.

Referring to the drawings, wherein like characters indicate like parts throughout the several views:

Fig. 1 is a view in side elevation, with some parts broken away, of a baby carriage, of the type known as a stroller, having an embodiment of my novel and improved braking mechanism as a part thereof;

Fig. 2 is a front view of the structure of Fig. 1;

Fig. 3 is an enlarged fragmentary view, partly in elevation and partly in vertical section, taken on the line 3—3 of Fig. 2, and showing the parts of my braking mechanism in their inoperative positions;

Fig. 4 is a view similar to Fig. 3 but showing the parts of my braking mechanism in their braking positions; and Fig. 5 is an enlarged fragmentary view, partly in plan and partly in horizontal section, taken on the line 5—5 of Fig. 1.

Referring now more particularly to the drawings, a baby carriage of the type generally known as a stroller is indicated in its entirety by the general reference numeral 10. The structure of stroller 10 apart from the braking mechanism thereof, which will be described subsequently in detail, forms no part of the instant application and the structure and operation thereof need not be described in detail. Briefly, the stroller 10 comprises frame structure, indicated generally by the numeral 11, seat structure 12, front wheel structure 13, and extendable handle structure 14. The upper inverted U-shaped handle member 15 is shown in its retracted position in Figs. 1 and 2 and handle member 15 is normally extended for normal operative use of the stroller 10.

Frame structure 11 comprises a pair of laterally spaced oppositely disposed mounting plates 16 which have slots 17 formed therein. Plates 16 mount and guide a rear axle 18 in slots 17 for movements between the normal operative position of axle 18 shown in the drawings and an upwardly disposed inoperative position which is not shown and which need not be described. It might be mentioned, however, that stroller 10 has a pair of laterally spaced connecting links 19 which are each anchored at one end to front wheel structure 13 and at their opposite ends to rear axle 18 whereby movements of the front wheel structure to an inoperative storage position, underlying seat structure 12, acts to move rear axle 18 to its upwardly disposed inoperative position. Stroller 10 has a pair of laterally spaced rear wheels 20 each of which is journalled on axle 18 adjacent a different end thereof. It would be obvious that axle 18 might comprise a pair of laterally spaced aligned axle portions, with one of the wheels 20 journalled on each axle portion.

My invention herein described and claimed relates to the braking mechanism for stroller 10; and this will now be described in detail.

My novel and improved braking mechanism is indicated in its entirety by the general reference numeral 21; and it comprises a longitudinally extended arm 22 formed of metallic sheet stock material. Arm 22 has an irregular slot 23 formed therein which is substantially centrally intermediate the ends thereof. By irregular, it is meant that slot 23 is not longitudinally straight. Arm 22 is mounted on rear axle 18 adjacent one of the rear wheels 20. Arm 22 is disposed between its associated wheel 20 and the adjacent mounting plate 16 which act to maintain it against lateral movement along the axle 18. A washer or the like 24 disposed between arm 22 and mounting plate 16 acts as a spacer on one side of the arm 22; and on the other side, arm 22 engages a laterally inwardly projecting hub portion 25 of its associated wheel 20. If braking mechanism 21 were to be used on a stroller which did not have the hub portion 25, one could use a washer or the like as a spacer. A braking element, indicated generally by the numeral 26 is connected at one end of arm 22 and extends at right angles with respect thereto laterally outwardly to be disposed adjacent and in face to face relationship with the outer rim of wheel 20, which in the case of stroller 10 is a tire member indicated by the numeral 27. Braking element 26 is formed by bending one end of the metal forming arm 22 at right angles laterally outwardly and then back upon itself to form a right angle projection which is covered by a rubber jacket or the like 28. This same end of arm 22 extends laterally beyond the projection forming braking element 26 in the opposite direction to project laterally inwardly of arm 22, at right angles thereto, and which forms a lug portion indicated by the numeral 29. The extreme end of lug portion 29 is bent at right angles to form a tab, indicated by the numeral 30, disposed in laterally inwardly spaced parallel relationship with arm 22. Lug portion 29 is narrowed adjacent tab 30 to be disposed between the adjacent mounting plate 16 and the adjacent one of the connecting links 19 which prevent rotational movement of arm 22 when braking mechanism 21 is in the braking position shown in Fig. 4. The end of arm 22 opposite from braking element 26 is bent at right angles to form a handle-like projection indicated by the numeral 31. Handle-like projection 31 is disposed in laterally spaced generally parallel relationship with braking element 26 but it projects in the opposite direction from arm 22 or laterally inwardly of the adjacent wheel 20. Arm 22 is not longitudinally straight between its opposite ends, handle portions 31 at one end and braking element 26 at the other, but it consists of what might be termed a pair of generally coplanar portions, one indicated by the numeral 32 which extends generally from the slot 23 to the braking element 26 in an inclined upward and forward direction, and the other portion, indicated by the numeral 33, extends generally horizontally from the slot 23 in a rearward direction; both portions 32 and 33 extending as aforementioned when arm 22 is positioned on and with respect to the normal forward direction of the stroller 10. It will be noted that slot 23 extends generally longitudinally of portion 32 of arm 22, that is, it is formed in portion 32 as a merely straight slot in the longitudinal direction of portion 32; and then, substantially adjacent the junction of portions 32 and 33 of arm 22, slot 23 extends transversely generally vertically upwardly. Thus, slot 23 when arm 22 is positioned on stroller 10, extends longitudinally generally upwardly and forwardly and adjacent the lower or forward end thereof, then extends transversely vertically upwardly. This form of slot 23 forms a stop shoulder 34 and also an inclined edge portion 35 which will be mentioned further subsequently. Braking mechanism 21 further comprises a coiled tension spring 36, one end of which is formed in the shape of a hook connected to the tab 30 and the other end of spring 36 encompasses and is connected to axle 18. Spring 36 is disposed in laterally spaced generally parallel relationship with portion 32 of arm 22 and yieldably biases braking element 26 toward axle 18.

The operation of my braking mechanism is briefly as follows. Figure 3 of the drawings shows the positions of the parts of my braking mechanism when braking element 26 is at its inoperative position in spaced relationship with outer rim or tire 27 of wheel 20. At the inoperative position of braking element 26, axle 18 is disposed in the transverse end portion of slot 23 and is in abutting engagement with stop shoulder 34. Spring 36 is under tension and biases axle 18 into engagement with stop shoulder 34 to maintain arm 22 and braking element 26 in the inoperative positions of Fig. 3. When it is desired to apply the brake 21, an operator moves handle portion 31 generally upwardly, and it might be moved by the operator either with his hand or foot; and this moves axle 18 relatively downwardly in slot 23 toward the generally longitudinal straight portion thereof which is formed in the upwardly and forwardly inclined portion 32 of arm 22 and out of engagement with stop shoulder 34, wherein spring 36 will move braking element 26 into engagement with the outer rim or tire 27 of its associated wheel 20 to the braking position as shown in Fig. 4. Spring 36 acts to maintain braking element 26 in braking engagement with its associated wheel 20. When it is desired to release brake 21, the operator manually moves arm 22 through handle portion 31 relative to axle 18 to the position shown in Fig. 3. Referring to Fig. 4, it will be noted that when brake 21 is in braking position, axle 18 engages inclined edge portion 35 which requires in moving brake 21 to the inoperative position of Fig. 3 that the operator manually move handle portion 31 generally upwardly and forwardly toward axle 18 against the bias of spring 36. In other words, inclined edge portion 35 forms generally a stop against longitudinal forward movement of arm 22 which aids in preventing accidental release of brake 21.

It will be noted that the length of arm 22 is generally the same as the diameter of wheel 20 and with arm 22 disposed laterally inwardly of wheel 20, brake 21 is practically obscured from view so that it does not detract from the appearance of stroller 10. Nevertheless, handle-like projection or portion 31 of arm 22 projects laterally inwardly of its associated wheel 20 so that it is readily accessible to the operator.

Braking mechanisms in accordance with my invention herein disclosed have been built and tested and found to accomplish all of the objectives of my invention and have been found to be entirely satisfactory and successful for its intended purposes. While I have specifically shown and described a preferred embodiment of my invention, it would be obvious to one skilled in the art that my invention is capable of modification and changes without departing from the spirit and scope of my invention; and therefore, I intend my invention to be limited solely by the scope of the appended claims.

What I claim is:

1. In a baby carriage having aligned axle portions and a pair of laterally spaced wheels mounted on said axle portions, a braking mechanism comprising a longitudinally extended arm, a braking element rigid with said arm adjacent one end thereof in transverse relationship therewith, said arm having a longitudinally extended slot of irregular shape formed therein intermediate the ends thereof, a pin-like mounting element disposed to extend in the same direction as the axis of and adjacent one of said wheels, said arm being mounted on said element which extends through said slot to dispose said arm adjacent one lateral side of one of said wheels in generally parallel relationship therewith and with said braking element disposed adjacent and in face to face relationship with the outer rim of the wheel, said slot extending generally longitudinally and adjacent one end thereof extending generally transversely to define a stop shoulder limiting longitudinal movement of said arm with respect to said pin-like element, said arm being mounted on said pin-like element for relative generally longitudinal movements generally at right angles to the axis of the wheel for moving said braking element toward and away from said rim between an inoperative position in spaced relation with said rim and a braking position in braking engagement with said rim, said pin-like element engaging said stop shoulder at the inoperative position of said braking element, and resilient means connected to said arm yieldably biasing said braking element toward its braking position.

2. The structure defined in claim 1 in which said pin-like element is a said axle portion.

3. In a baby carriage having an axle and a pair of laterally spaced wheels mounted on said axle, a braking mechanism comprising a longitudinally extended arm, a braking element connected to said arm adjacent one end thereof in transverse relationship therewith, said arm having a longitudinally extended slot of irregular shape formed therein intermediate the ends thereof, said arm being mounted on said axle for relative movement of said axle in said slot and to dispose said arm adjacent one of said wheels in generally parallel laterally inwardly spaced relationship therewith with said braking element extending laterally outwardly of said arm to be disposed adjacent and in face to face relationship with the outer rim of the said one wheel, said arm comprising a pair of generally coplanar portions one extending generally from said slot to said braking element in an inclined upward and forward direction and the other portion extending generally horizontally from said slot in a rearward direction, said slot extending longitudinally of said one portion of said arm to extend generally upwardly and forwardly and adjacent the lower end thereof extending transversely generally upwardly to define a stop shoulder, said arm being movable longitudinally generally at right angles to said axle for moving said braking element toward and away from said rim between an inoperative position in spaced relation with said rim whereas said axle engages said stop shoulder to releasably maintain said braking element at its inoperative position and a braking position in braking engagement with said rim, and a coil spring disposed in spaced generally parallel relationship with said one portion of said arm connected at one end to said axle and at its other end to said arm adjacent said braking element for yieldably biasing said braking element toward its braking position.

References Cited in the file of this patent

UNITED STATES PATENTS

| 898,904 | Londress | Sept. 15, 1908 |
| 1,895,150 | Darnell | Jan. 24, 1933 |
| 2,147,064 | Schultz | Feb. 14, 1939 |
| 2,864,465 | Welsh et al. | Dec. 16, 1958 |

FOREIGN PATENTS

| 316,020 | Great Britain | July 25, 1929 |